United States Patent [19]

Reinhardt et al.

[11] Patent Number: 4,724,347

[45] Date of Patent: Feb. 9, 1988

[54] COLLECTORLESS DIRECT-CURRENT MOTOR

[75] Inventors: Wilhelm Reinhardt, Schrozberg-Guetbach; Gunther Hofele, Goeppingen, both of Fed. Rep. of Germany

[73] Assignee: ebm Elektrobau Mulfingen GmbH & Co., Fed. Rep. of Germany

[21] Appl. No.: 781,509

[22] Filed: Sep. 30, 1985

[30] Foreign Application Priority Data

Oct. 30, 1984 [DE] Fed. Rep. of Germany ....... 3439665

[51] Int. Cl.$^4$ ............................................ H02K 11/00
[52] U.S. Cl. .................................. 310/68 R; 310/42; 310/67 R; 310/71; 310/72; 310/89; 310/DIG. 6
[58] Field of Search ............. 310/46, 42, 68 R, 68 D, 310/67 R, 156, 72, 90, 89, 91, 64, 65, DIG. 6, 71

[56] References Cited

U.S. PATENT DOCUMENTS

| | | | |
|---|---|---|---|
| 3,226,581 | 12/1965 | Brewster | 310/65 |
| 3,250,929 | 5/1966 | Maier | 310/64 |
| 3,412,303 | 11/1968 | Rakes | 310/480 |
| 3,483,408 | 12/1969 | Frohmuller | 310/71 |
| 3,527,972 | 9/1970 | Franz | 310/71 |
| 3,538,362 | 11/1970 | Cheetham | 310/71 |
| 3,539,848 | 11/1970 | Dosch | 310/64 |
| 3,539,850 | 11/1970 | Sato | 310/71 |
| 3,970,881 | 7/1976 | Sato | 310/68 D |
| 4,217,508 | 8/1980 | Uzaka | 310/67 R |
| 4,259,603 | 3/1981 | Uchiyama | 310/67 R |
| 4,371,817 | 2/1983 | Muller | 310/46 |
| 4,429,263 | 1/1984 | Muller | 310/68 R |
| 4,554,473 | 11/1985 | Muller | 310/68 R |
| 4,558,245 | 12/1985 | Glasauer | 310/DIG. 6 |

FOREIGN PATENT DOCUMENTS

| | | | |
|---|---|---|---|
| 1638216 | 7/1971 | Fed. Rep. of Germany .... | 310/68 R |
| 3151596 | 2/1982 | Fed. Rep. of Germany .... | 310/68 R |

Primary Examiner—R. Skudy
Attorney, Agent, or Firm—Jones, Askew & Lunsford

[57] ABSTRACT

A collectorless direct-current motor with a stator mounted on a motor flange and a rotor mounted so that it can rotate on a shaft, in which case power semiconductors for the purpose of commutating the currents of the stator are attached to parts of the motor for the purpose of dissipating the heat and a circuit board with electronic components is provided for the purpose of controlling the commutation, and the power semiconductors are electrically connected to the circuit board, in which case the power semiconductors (39) are attached to the motor flange (2), preferably the outside (29) thereof, in heat conducting contact.

19 Claims, 2 Drawing Figures

COLLECTORLESS DIRECT-CURRENT MOTOR

This invention concerns a collectorless direct-current motor with a rotor mounted so it can rotate on a shaft, in which case power semiconductors for commutating the currents of the stator are mounted on parts of the motor for the purpose of dissipating the heat, and a circuit board with electronic components is provided for controlling comutation and the power semiconductors are electrically connected to the circuit board.

In collectorless direct-current motors, commutation of the stator winding currents is accomplished by power semiconductors, preferably power transistors. The commutation process is controlled by one or more Hall IC's which determine the respective angular position of the rotor. During the interconnection phase of each power transistor, there is a power loss due to the collector-emitter residual voltage in the form of heat which must be dissipated. Depending on the motor power and the amount of the collector-emitter residual voltage, the power loss may lead to a substantial increase in temperature of the power transistors, which can result in their destruction if too much heat is evolved.

It is known that power semiconductors of such direct current motors can be mounted on a circuit board which also accommodates electronic components for the purpose of controlling commutation. As a result of the small space available on the circuit board which is then located inside the motor, there is either not enough room to provide cooling plates for the power semiconductors on the circuit board or those which are provided are inadequate. In view of this inadequate cooling, there is the above-mentioned risk of destruction of the power semiconductors due to overheating. The fact that the power semiconductors are located inside the motor also prevents any dissipation of heat, because a heat buildup can occur there due to inadequate ventilation. Furthermore, in addition to the heat evolved by the power semiconductors, there is also the heat emitted by the windings of the DC motor.

A collectorless DC motor of the type described initially is disclosed in German Pat. (OLS) No. 3,151,596, where the power semiconductors which are provided for commutation are located on the stator iron core of the motor in a heat-conducting contact. In mounting the stator winding on the stator iron core, the coils thus pass over the power semiconductors, so the latter are covered by the winding and thus are no longer accessible from the outside. The disadvantage of this is that it is no longer possible to subsequently replace the power semiconductors. Furthermore, the power semiconductors are directly exposed to the heat generated in the stator winding, which leads to an additional temperature increase on the poer semiconductors and is thus a disadvantage.

A collectorless DC motor is described in German Pat. (OLS) No. 1,638,216, where the power transistors which are provided for the purpose of commutation are in thermal contact with a hub of the motor. The other components which are provided for controlling commutation are on a ring-shaped circuit board which is inside the motor and is glued to the hub. In addition, two sliding bearings for the rotor axle of the motor are inserted into the hub. A disadvantage of this is that the hub has a very low heat absorption capacity due to the thin walls and small dimensions and thus heats up to a high temperature extremely rapidly during operation of the known motor. Moreover, the round shape of the hub prevents large surface contact with the power transistors, so there is a poor transfer of heat. Furthermore, the power transistors are mounted inside the motor surrounded by its "active" parts, so here again the heat buildup effect described above can also occur. Moreover, dissipation of the heat loss of the transistors to the hub leads to heating of the rotor bearings because they are in thermal contact inside the hub. The high bearing temperature which thus necessarily results shortens the lifetime of the bearings.

This invention is thus based on the problem of creating a collectorless direct-current motor of the type described initially, such that the power semiconductors are cooled very well, and especially there is a simple access to the power semiconductors and these components are both simple to assemble and connect.

This problem is solved according to this invention by the fact that the power semiconductors are mounted on the motor flange, preferably the outside of it, in heat-conducting contact. Due to the arrangement according to this invention, excellent dissipation of heat is assured for the power semiconductors, because the motor flange is in direct contact with the outside air and can dissipate the absorbed heat to the outside air. The motor flange has a sufficiently large heat absorption capacity to assure adequate cooling of the power semiconductors. Furthermore, there is the advantage that the motor flange is hardly heated by the stator winding or any other heat sources, so it is essentially responsible only for cooling the power semiconductors. Especially when the power semiconductors are mounted on the outside of the motor flange facing away from the stator, access to the power semiconductors is simple, e.g., for testing and measurement purposes, and it is also simple to replace defective power semiconductors because no dismantling of the motor is necessary.

According to another version of this invention, the electrical connection of the power semiconductors is through at least one opening through the motor flange. Preferably, one opening is provided for each power semiconductor. This design assures short connection pathways to the circuit board.

According to another modification of this invention, the power semiconductors are connected by means of plugs which are preferably mounted in the openings. The plug elements especially simplify electrical connection of the power semiconductors and also make it possible to exchange them easily because a defective power semiconductor is removed from the outside of the motor flange without dismantling the motor and the electrical connection can be broken by unplugging the plugs and then it is easy to install a new power semiconductor with appropriate mounting devices and connect it electrically by connecting the plugs.

According to an especially preferred version of this invention, the size of the opening is such that it makes it possible for the appropriate power transistor to be pushed through the opening. This design makes it possible to insert all the components at the time of manufacture of the circuit board, i.e., the power semiconductors can also be connected to it electrically. This in turn makes it possible to solder all the components (even the power semiconductors) in one step in a soldering bath. In assembling the DC motor according to this invention, the circuit board is mounted in the interior of the motor, and when subsequently attaching the motor flange to the stator, the power semiconductors that require cooling are passed through openings of appropriate sizes in the motor flange. After connecting the motor flange to the stator, the power semiconductors are then connected to the motor flange in a heat conducting contact by bending the connecting wires appropriately. The possibility of inserting the power semiconductors through the openings also makes it possible to dismantle the motor flange without having to disconnect the electric leads to the power semiconductors.

The figures illustrate this invention on the basis of a practical example.

Figure 1:
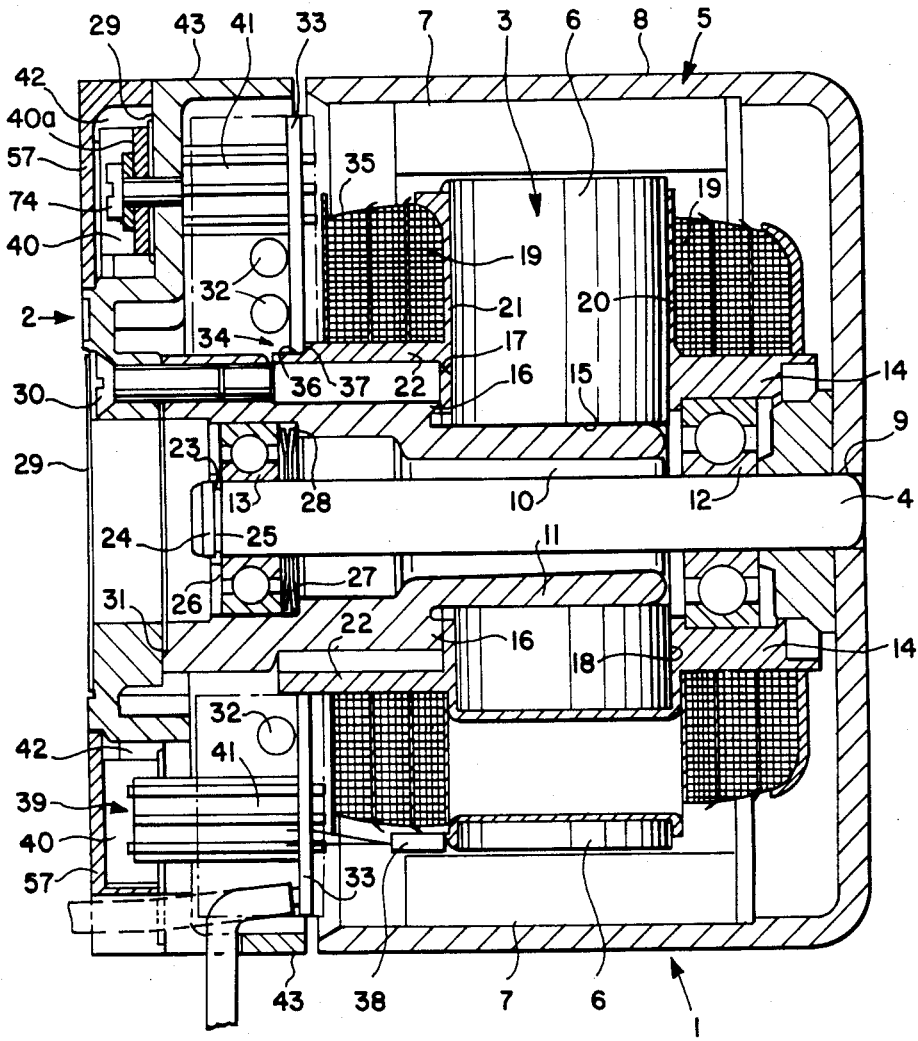
FIG. 1 shows a sectional view through a collectorless DC motor according to this invention.

The collectorless DC motor shown in FIG. 1 is designed as an external rotor motor 1 and consists essentially of a stator 3 attached to a motor flange 2 plus a rotor 5 which is mounted so that it can rotate on shaft 4. Rotor 5 surrounds stator 3 in a bell shape. Inside rotor 5 there is a permanent magnet 7 which is radially opposite the stator iron core 6 of stator 3. The permanent magnet may be in the form of a so-called rubber magnet of barium ferrite or an oxide ceramic ferrite magnet. Rubber magnet 7 may consist of a magnetic ring, a magnetic tape or individual magnet segments and is either glued or inserted into the rotor pot 8 of rotor 5, depending on the type of magnet. The rotor pot 8 has an axial borehole 9 into which shaft 4 is inserted. Shaft 4 extends through the inside 10 of a bearing support tube 11 and is mounted in bearings 12 and 13, preferably ball bearings. The rotor-side bearing 12 is mounted inside an insulating shaft 14, while the bearing 13 next to the motor flange 2 is mounted inside bearing support tube 11. The stator iron core 6 has a passage 15 into which is inserted bearing support tube 11 which is supported in axial direction on one end 17 of the stator iron core 6 with a ring collar 6 and extends approximately to the other end 18 of the stator iron core 6. Stator 3 has a stator winding 19 which is insulated with respect to the ends 17 and 18 of the stator iron core 6 by means of insulation disks 20 and 21. One area of the bearing support tube 11 is surrounded by a stator-side insulation shaft 22 in the form of a ring collar to provide insulation with respect to the stator winding 19. Rotor 5 is a secured axially by means of a safety ring 23 which is attached to a ring groove in one free end 24 of shaft 4. The rotor shaft is supported axially by means of a plate spring 27 which rests against the outside ring of ball bearing 13 as well as a ring shoulder 28 in bearing support tube 11. Motor flange 2 is attached to bearing support tube 11 by means of threaded screws 30 which are accessible from the outside 29. Motor flange 2 is supported on one end 31 of the free end of bearing support tube 11.

For controlling commutation, the collectorless DC motor according to this invention has a circuit board 33 complete with electronic components 32. Circuit board 33 is pushed axially onto the free end 34 of insulation shaft 22 and secured there. Circuit board 33 has copper conductors on one side and is located between the winding head 35 of stator winding 19 and motor flange 2, in which case the side of circuit board 33 that has the copper conductors faces winding head 35. For the purpose of securing and aligning the circuit board 33, it has an opening 36 through which the free end of insulation shaft 22 passes, and the side of circuit board 33 which has the conductors is in contact with a ring step 37 of insulation shaft 22. Preferably, circuit board 33 is fixed exactly by means of a twistproof device (not shown). This accurate fixation is necessary to position a Hall generator 38 which is connected to circuit board 33 in the optimum operating position. This position is approximately in or near the groove apertures of stator iron core 6. Hall generator 38 determines the angular position of rotor 5 and controls commutation of the stator currents in accordance with the angular position of the rotor. The electronic components 32 that are provided directly on circuit board 33 may include, for example, small-signal transistors, diodes, resistors, etc., which undergo little or no heating during operation. For commutation of the stator current, there are power semiconductors 39 in the form of power transistors 40. These power transistors 40 are not located directly on the circuit board 33, as explained in detail below, but instead are located at some distance from it connected by ribbon leads 41.

Since power transistors 40 heat up during operation of the collectorless DC motor according to this invention, they are connected to motor flange 2, preferably the outside 29 thereof, in a heat-conducting contact in order to cool them and achieve effective dissipation of heat. Very good heat transfer between these parts is assured by means of large surface contact between power transistors 40 and motor flange 2. Preferably, power transistors 40 are located in recesses 42 on the outside 29 of motor flange 2.

Figure 2:
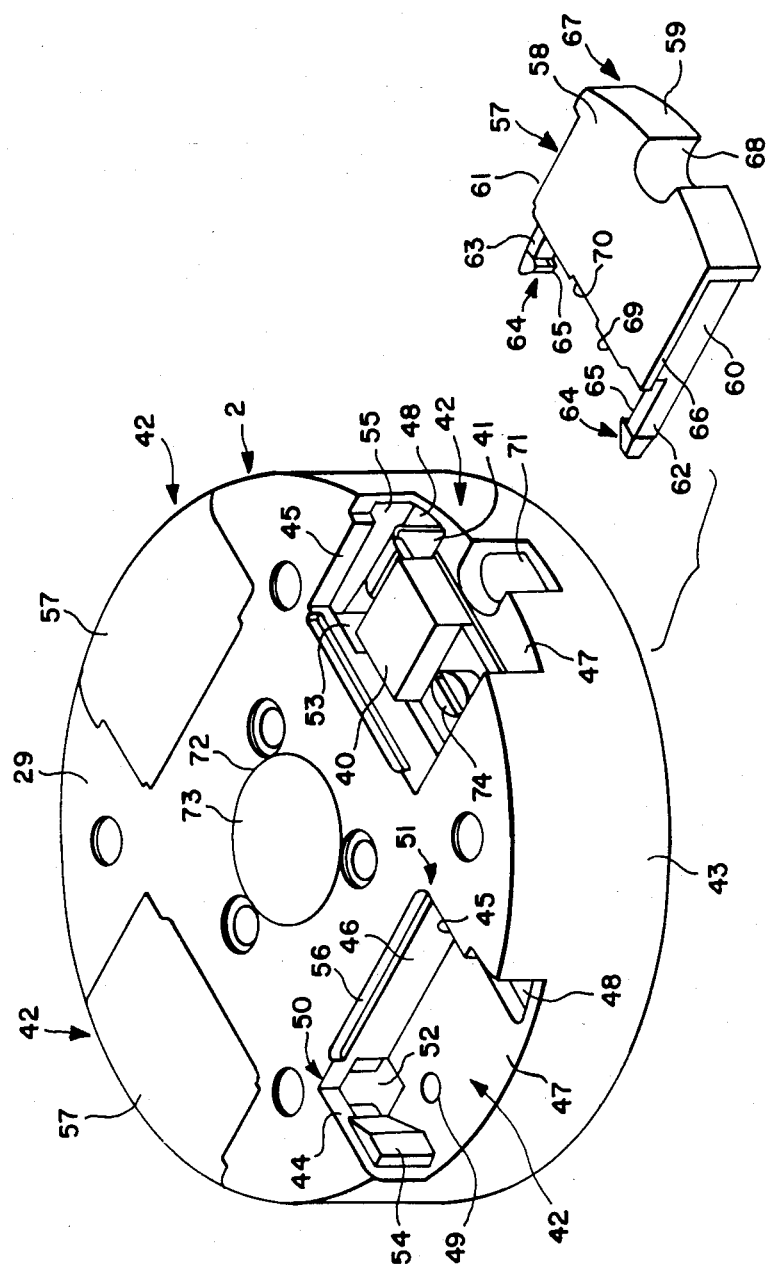
FIG. 2 shows a perspective view of a motor flange of the DC motor according to FIG. 1, whereby a shockproof cap which covers a recess in the motor flange is shown in the position after removal.

The design of these recesses 42 is especially evident in FIG. 2 which shows the motor flange 2 essentially from the outside 29. Motor flange 2 has essentially a cylindrical shape bordered by an outer edge 43 and is hollow on the inside (FIG. 1) so there is enough room for the electronic components 32 on circuit board 33. According to FIG. 2, there are four recesses 42, one for each power resistor 40, which are offset by 90° with respect to each other, starting from outer edge 43 of motor flange 2 and extending in radial direction inward. Each recess 42 has a first side wall 44, a second side wall 45, a rear wall 46 and a bottom 47. The first side wall 44 is parallel with the second side wall 45, and rear wall 46 is at right angles with the two side walls 44 and 45 and also to the bottom 47. The two side walls 44 and 45 are also at right angles with bottom 47. Recesses 42 are open along the outside edge 43 of the motor flange and fit the dimensions of power transistors 40 with regard to the peripheral direction as well as depth. Next to second side wall 45, an approximately rectangular opening 48 is provided in the bottom 47 of each recess 42 and passes through the motor flange in axial direction. Opposite opening 48 there is a threaded hole 49 near the first side wall 44 in bottom 47. A catch opening 52 and 53 is provided in each corner 50 and 51 formed by rear wall 46 and adjacent side walls 44 and 45. A lengthwise piece 54 which extends in axial direction as far as the bottom 47 of recess 42 is provided on the first side wall 44. A lengthwise groove 55 is provided on the second side wall 45 next to bottom 47 running along the entire depth of recess 42. A step 56 is provided at the corner formed by outside 29 of motor flange 2 and rear wall 46.

In the example illustrated here, three recesses 42 are the same. One recess 42 has a different edge area for connection of the motor power cord. According to a version of this invention which is not shown here, it is also possible to have only three recesses on motor flange 2 instead of four for a corresponding number of power transistors 40, depending on the type of commutation.

According to FIG. 2, shockproof caps 57 are provided to cover recesses 42. They are preferably made of injection molded plastic and completely cover recesses 42 with the transistors inserted into them, in which case they are flush with the outside 29 as well as the outside edge 43 of motor flange 2. Shockproof caps 57 provide dust protection for power transistors 40 and protect against shock.

Each shockproof cap 57 has a flat top side 58 as well as a partially circular end wall 59. Catch fingers 62 and 63 are provided on each of the opposite sides 60 and 61 of shockproof cap 57 with a catch nose 65 on one free end 64. An edge piece 66 is provided on side 60 of shockproof cap 57 in the area of the top and a guide piece (not shown) is provided on side 61. A recess 68 which is open at the edge is provided in the area of end wall 59 at one shockproof cap 57 for connecting the motor power cord to end 67, and this recess 68 extends over the entire height of shockproof cap 57. Recess 68 is opposite a recess 70 on side 69 adjacent to the top side 58 of shockproof cap 57.

There is a passage 71 through motor flange 2 for connecting the motor power cord, partially in the bottom 47 of one of the recesses and also in an adjacent area of the outside edge 43. In addition, the motor flange has a central axial hole 72 which can be covered by means of a bearing cover 73 that can be removed from the outside.

The DC motor according to this invention is assembled as follows. First, a circuit board 33 complete with electronic components 32 and power transistors 40 connected by ribbon conductors 41 is pushed onto the free axial end 34 of insulation shaft 22 until circuit board 33 is in contact with ring step 37 of insulation shaft 22. Then the circuit board 33 is secured by caulking. Next, circuit board 33 is accurately positioned by means of the twistproof device (not shown) so the Hall generator 38 is in the optimal operating position. After connecting the ends of the stator winding to circuit board 33, motor flange 2 is placed on stator 3 and power transistors 40 which have already been soldered to circuit board 33 by means of their ribbon leads 41 are pushed through the appropriate openings 48 in motor flange 2. Openings 48 have dimensions which make it possible for the power transistors to be pushed through in longitudinal direction. Then motor flange 2 is securely bolted to bearing support tube 11 by means of threaded screws 30 which are screwed in appropriate threaded holes of bearing support tube 11. Next, ribbon leads 41 of power transistors 40 are bent at right angles into the plane of the motor flange 2 and attached to the bottoms 47 of recesses 42 so there is a large area of heat conducting contact by means of screws 74 which are screwed into threaded holes 49. The approximately right angle bend in ribbon leads does not cause mechanical stress on the contacting points formed by the connection between ribbon leads 41 and connecting wires of power transistors 40. Contact may be provided by welding or soldering. In the example illustrated here, ribbon leads 41 must be used because the power transistors 40 have a relatively great distance from circuit board 33. However, according to other examples which are not illustrated here, it may also be the case that no ribbon leads 41 are needed for connection of the power transistors 40, either when the power transistors have long enough connecting wires of their own or there is very little distance between circuit board 33 and the mounting sites for power transistors 40.

Preferably, an insulating disk 40a, e.g., of mica, is used to provide electrical insulation of power transistors 40 with respect to motor flange 2 and is inserted between power transistors 40 and motor flange 2. This insulating disk provides electrical insulation of the components, but permits unhindered heat exchange.

The design according to this invention thus makes it possible for circuit board 33 to be completely fitted with electronic components 32 as well as power transistors 40 before it is installed in the DC motor according to this invention. The possibility of inserting power transistors through openings 48 in motor flange 2 greatly simplifies assembly and dismantling of the motor flange 2 because soldering and unsoldering of the power transistors is unnecessary. The large area of contact between the power transistors 40 and motor flange 2 assures optimum cooling of the power transistors, since the motor flange has a large heat absorption capacity and the heat that is absorbed can be effectively dissipated to the outside air. Furthermore, the motor is attached to an appropriate support by means of motor flange 2 at the site of use, so the heat dissipated to the motor flange by the power transistors can also be released to these substrates, thus improving the cooling effect.

According to another version of this invention which is not shown here, the power transistors 40 are connected by means of plug elements which are preferably mounted in the openings 48. This measure makes it possible to connect the power transistors without soldering. In assembly of the motor flange, the electrical connection to the power transistors 40 is accomplished by connecting the plug elements. In separating motor flange 2 from the DC motor, the connecting lines to the power transistors are then separated by unplugging the plug elements accordingly.

Following assembly of the DC motor according to this invention as described above, rotor 5 is assembled by inserting shaft 4 into bearings 12 and 13 and securing shaft 4 with the help of locking ring 23.

After function testing of the motor, shockproof caps 57 are placed on recesses 42. The shockproof caps 57 are secured by radial insertion into the appropriate recess 42, in which case each shockproof cap is supported with its edge piece 66 on the corresponding lengthwise piece 54 of recess 42 on the one hand, and on the other hand the guide piece of the shockproof cap 57 engages lengthwise groove 55. When fully inserted, the upper edge of side 69 of shockproof cap 57 catches in step 56 of recess 42. The two catch fingers 62 and 63 then engage catch openings 52 and 53 of recess 57, locking catch noses 65 of catch fingers 62 and 63 inside these catch openings 52 and 53. This provides dustproof and shockproof encapsulation of power transistors 40.

Simple removal of the shockproof caps requires only a tool (not shown) such as a screwdriver which is inserted in recess 70 of shockproof cap 57, in which case the tip of the screwdriver is supported on shockproof cap 57 and motor flange 22 and shockproof cap is removed radially from recess 42.

According to another version of this invention which is now shown here, guide pieces may be provided on motor flange 2 to secure the shockproof caps 57 and engage side guide grooves on the shockproof caps. For inserting a power cord for the DC motor, there is a passage 71 on the motor flange and recess 68 on the corresponding shockproof cap. When the shockproof cap 57 is inserted, recess 68 and passage 71 are flush. Thus, on the whole, both radial and axial insertion of the power cord are possible.

In order to be able to dismantle bearings 12 and 13 even when the DC motor is assembled, the bearing cover 73 may also be removed from hole 72 of motor flange 2 from the outside. Hole 72 has a larger diameter than the outer ring of the ball bearing 13. After removing safety ring 23, rotor 5 can be removed and then bearing 13 can be removed from the interior of the motor through hole 72. After removing rotor 5, bearing 12 is also accessible. After dismantling, for example, new bearings can be inserted, in which case the individual steps are performed in the opposite order. After conclusion of the assembly work, hole 72 is covered by means of bearing cover 73 to prevent soiling of the bearings.

This invention permits optimal cooling of the power semiconductors of the collectorless DC motor which are provided for the purpose of commutation. Furthermore, it permits a simple method of assembling and dismantling the electrical and mechanical parts. It is also easy to perform tests on the power semiconductors after the shockproof caps have been removed. In addition, after loosening the semiconductor mounting screws, motor flange 2 can easily be separated from the DC motor, so circuit board 33 with its electronic components is accessible.

We claim:

1. Collectorless direct-current motor with a stator attached to a motor flange and a rotor mounted to rotate on a shaft, in which case power semiconductors for commutation of the currents of the stator are attached to parts of the motor for the purpose of dissipation of heat, and a circuit board with electronic components is provided for controlling commutation with the power semiconductors electrically connected to the circuit board, characterized by the fact that the power semiconductors are attached to the motor flange in a heat conducting contact;

said power semiconductors being electrically connected by means secured in openings which pass through the motor flange, said openings being sized just large enough to permit the power semiconductors to be inserted therethrough in longitudinal direction;

the power semiconductors being attached by means of mounting screws accessible from the outside of the motor flange;

the power semiconductors being located in recesses on the motor flange; and the recesses being covered by removable shockproof caps.

2. Direct-current motor according to claim 1, wherein the shockproof caps are secured in said recesses by means of a lock fit.

3. Direct-current motor according to claim 2, wherein each of said shockproof caps has a catch finger on each of two opposite sides, and the catch fingers have free ends with catch noses which fit into corresponding catch openings of said recess and lock there.

4. Direct-current motor according to claim 1, wherein the shockproof caps are inserted into the recesses from the outside edge of motor flange in which case guide parts on the motor flange mesh with side guide grooves of the shockproof caps.

5. Direct-current motor according to claim 1, wherein each of said recesses has a first side wall and a second side wall, a rear wall and a bottom, the first side wall has a lengthwise piece and the second side wall has a lengthwise groove, and each of said shockproof caps is supported on the lengthwise piece with an edge piece on one side, and on the other side with a guide piece meshing with the lengthwise groove.

6. Direct-current motor according to claim 5, wherein on the side which interacts with the rear wall of the recess, each shockproof cap has a recess that is open at the edge and is accessible from the outside so that said shockproof caps can be removed from their lock fit with a tool.

7. Direct-current motor according to claim 1, wherein on the end which closes the outside edge of the motor flange at least one of the shockproof caps has a recess which is open at the edge for a power cord of the direct-current motor and which is flush with a passage through the motor flange in the outside wall area of the one shockproof cap, so that the passage is partially in an adjacent area of the outside edge of the motor flange.

8. A collectorless direct-current motor comprising:
a motor flange,
an inner stator attached to said motor flange;
an inner rotor rotatably mounted by a shaft;
power semiconductors operative for commutation of electrical current in said stator;
a circuit board mounted inside said motor flange for controlling commutation, said power semiconductors having electrical connectors extending to said circuit board;
said power semiconductors being attached within recesses of said motor flange in good heat conducting relation therewith, so as to dissipate heat developed in the power semiconductors;
said electrical connectors of each said power semiconductor passing through corresponding openings in alignment with said motor flange; each said opening being aligned with corresponding recess, adapted to be covered
the size of each said recess being just large enough to permit one of said power semiconductors to be passed through the recess, as the motor flange is attached to the stator while passing the power semiconductors through the corresponding recesses in the motor flange; and
means for attaching the power semiconductors within the recesses of the motor flange in said good heat conducting relation, after the motor flange is attached to the inner stator.

9. Direct-current motor according to claim 8, wherein the openings are just large enough to permit the power semiconductors to be pushed therethrough in longitudinal direction.

10. Direct-current motor according to claim 8, wherein the power semiconductors have a large area of contact with the motor flange.

11. Direct-current motor according to claim 9, wherein the power semiconductors are connected to the motor flange by means of mounting screws.

12. Direct-current motor according to claim 8, wherein at least one of said openings is provided inside each said recess.

13. Direct-current motor according to claim 8, wherein the power semiconductors are connected to the circuit board by means of said electrical connectors comprising ribbon leads.

14. Direct-current motor according to claim 13, wherein the ribbon leads are attached to the connecting wires of the power semiconductors.

15. Direct-current motor according to claim 13, wherein the ribbon leads pass through the openings and are bent in the peripheral direction without any mechanical stress on the connections of the ribbon leads.

16. Direct-current motor according to claim 8, wherein an insulating disk is provided between each power semiconductor and the motor flange to provide electrical insulation.

17. Direct-current motor according to claim 8, wherein the motor flange has a borehole which is flush with the shaft of the direct-current motor and which has a larger diameter than the adjacent bearing of the shaft.

18. Direct-current motor according to claim 17, wherein the borehole is closed by means of a bearing cover that can be removed from the outside of the motor flange.

19. Direct-current motor according to claim 8, wherein the stator has an insulating shaft and the circuit board is pushed onto the end of the insulating shaft which faces the motor flange and is secured thereon.

* * * * *